Oct. 22, 1940.  J. RINNE  2,218,938
APPARATUS FOR REDUCING FRICTIONAL RESISTANCE
OF LIQUID ON FLOATING BODIES
Filed Jan. 14, 1939   2 Sheets-Sheet 1
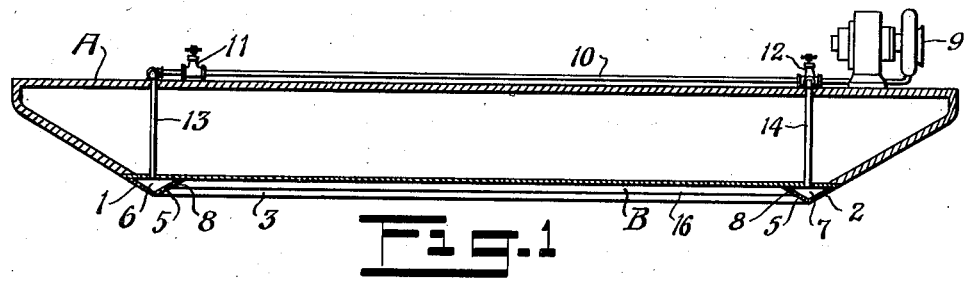
Fig. 1
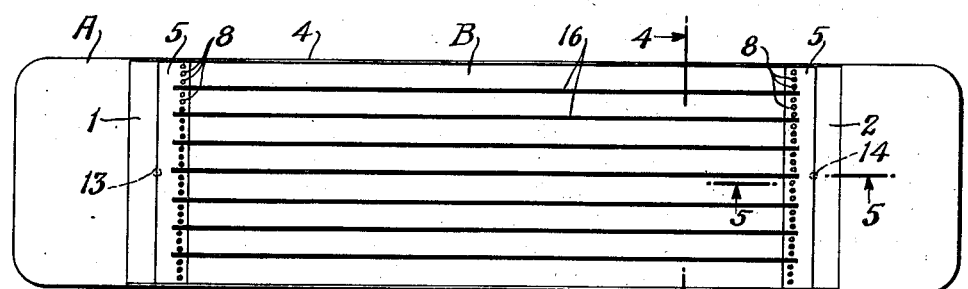
Fig. 2
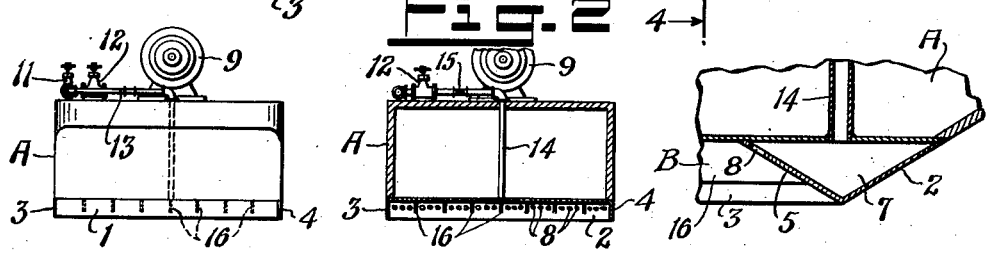
  
Fig. 3   Fig. 4   Fig. 5
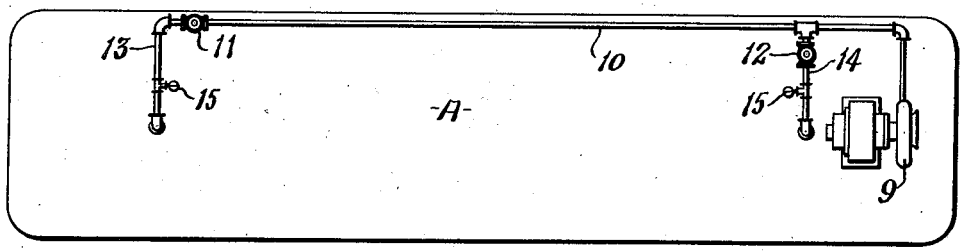
Fig. 6
INVENTOR
John Rinne

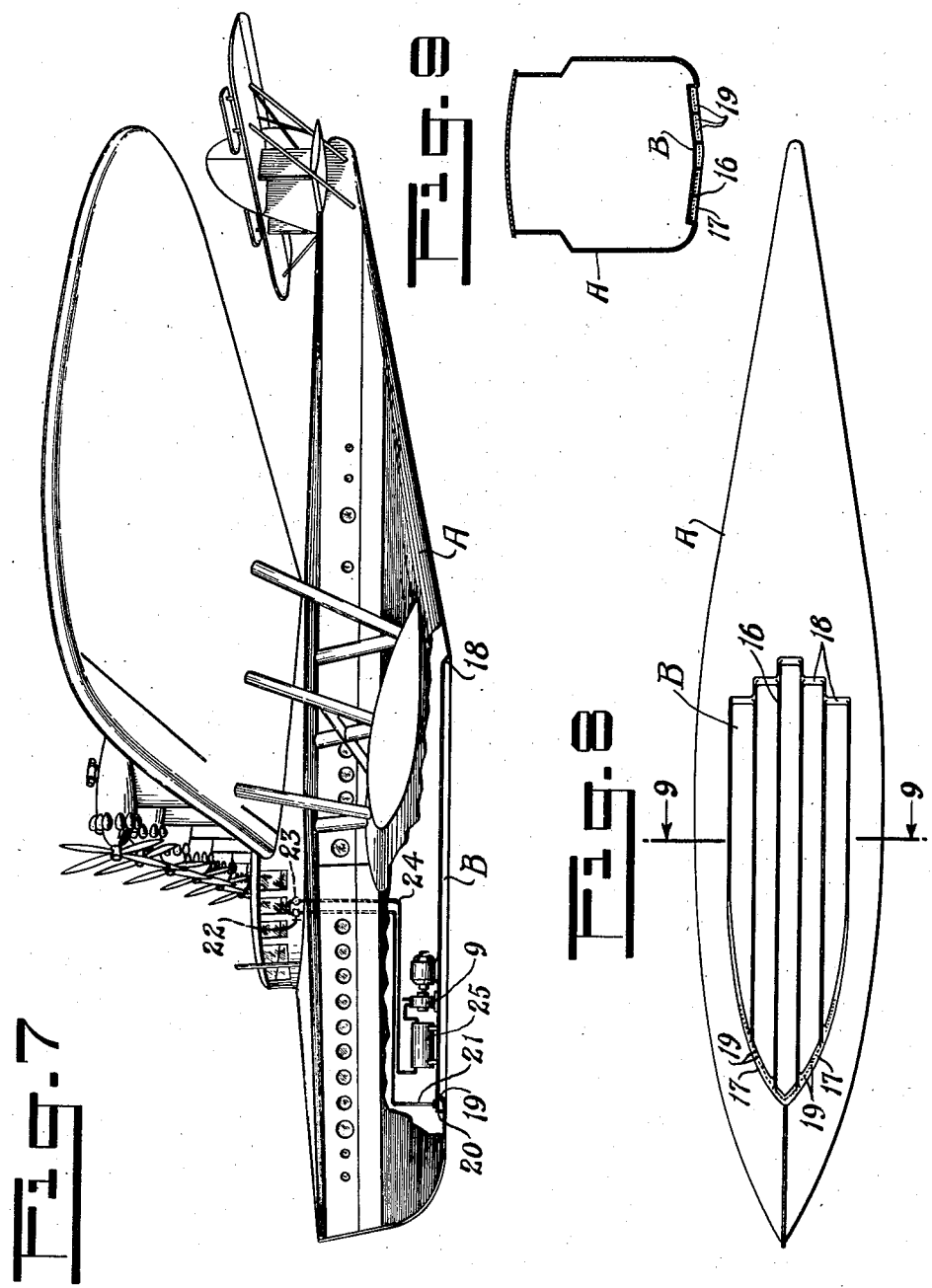

Patented Oct. 22, 1940

2,218,938

UNITED STATES PATENT OFFICE 2,218,938

APPARATUS FOR REDUCING FRICTIONAL RESISTANCE OF LIQUID ON FLOATING BODIES

John Rinne, Brooklyn, N. Y.

Application January 14, 1939, Serial No. 250,884

1 Claim. (Cl. 114—67)

It is well known that in driving a vessel through water, a large part of the resistance to the movement is caused by so called skin friction, and that only a small part of the propulsive force is used to overcome the head resistance. It is also known that frictional drag between a solid surface and air in contact therewith is so small that it is almost negligible. Thus it is evident that if the frictional resistance on such surface whereon the liquid contact has been replaced by air is eliminated, the propulsive force that is required for maintaining a certain speed may be reduced, or if the same power is maintained, the speed of the vessel will be considerably increased.

I am aware that it has heretofore been proposed to force air currents under or about the hull of a vessel with the object of reducing the frictional resistance of the water, but in these proposals the air was free to escape laterally from under and up the sides of the hull to the surface of the water and would have only a negligible effect, if any, in reducing the frictional resistance. I am also aware that it has been proposed to force air through channels extending longitudinally along the underside of the hull bottom and allowed to escape at the stern. All these proposals require a constant supply of air under pressure to replace escaped air and to overcome the water pressure, and furthermore the air is more likely to form into bubbles so that the hull will partly, if not largely, remain in direct contact with the water thereby minimizing any effect the air might have in decreasing the frictional resistance.

The object of my invention is to provide a stable stratum of air under the hull of a vessel and for this purpose I provide the hull bottom with a depression or recess which extends the length and breadth of the hull bottom, or the major part thereof, and forms a pocket in which air may be trapped against escape laterally from under and up the sides of the hull and at the bow and stern, and thus when air is forced into the pocket a stable continuous stratum of air may be maintained under the hull, so that the vessel will largely, if not entirely, rest on a stable stratum of air. This continuous stratum of air, trapped against escape and practically immovable relative to the hull of the vessel, therefore moves with the vessel on the water and thereby greatly reduces the total frictional resistance of the water on the hull while the vessel is moving.

With this and other objects the invention also comprises various novel features of construction which will be set forth in detail in the following description and claim.

The invention may be applied to all floating bodies and vessels of all types, such as steamships, sailing vessels, barges, speed-boats, seaplanes, and all objects designed to be driven upon or through water.

In the accompanying drawings the invention is illustrated as applied to several types of vessels, similar reference characters indicating corresponding parts throughout the several views, and in which—

Figure 1 is a longitudinal elevation of a barge.

Figure 2 an exterior view of the bottom of the barge shown in Figure 1.

Figure 3 an end view taken from the left of Figure 1.

Figure 4 a sectional view on the line 4—4 of Figure 2.

Figure 5 a sectional view on the line 5—5 of Figure 2.

Figure 6 a top plan view of the barge shown in Figure 1.

Figure 7 an elevation illustrating the invention applied to a seaplane.

Figure 8 a bottom view of the hull of the seaplane shown in Figure 7, and

Figure 9 a cross-section on the line 9—9 of Figure 8.

Referring to the drawings, and more particularly to Figures 1 to 6, A represents the hull of a vessel of any type, but schematically illustrating the hull of a flat bottomed barge for lightering cars, freight, etc. The bottom of the hull is recessed to form an air pocket B extending the entire area of the bottom as seen in Figure 2. This recess may be formed in various ways such for instance as forming a depression in the hull, and as a specific way of forming this recess the hull may be provided with fore and aft ridge plates 1 and 2 and longitudinal plates or keels 3 and 4. The plates 1—2 in the illustration shown extend across the width of the hull-bottom and may be formed by extending the hull plates below the bottom and bending the lower parts 5 upward and inward toward the hull bottom to form troughs shown as V-shaped in cross-section in Figure 5. The purpose in bending the ridge plates 1—2 to form troughs, which are closed at the ends by keel plates 3—4, is to provide air distributing chambers or manifolds 6—7 having a series of perforations or air outlets 8 opening into the recess area B close to the hull bottom. Mounted on the deck or within the hold of the vessel is a power driven air compressor indicated at 9, the air outlet of which is connected to a pipe line 10. Connected to this pipe line as seen in Figure 6 are valves 11 and 12 for controlling the flow of air to service pipes 13 and 14. The service pipes lead into the manifolds 6 and 7, respectively, to supply air thereto and from which the air escapes through outlets 8 under the hull and within the recess area enclosed by ridge plates 1—2 and keel plates 3—4.

In carrying my method into effect the air compressor 9 is started in operation and, in the case of a double-ended vessel, either one of valves 11—12 is opened according to which controls the air flow to the forward air manifold 6 or 7. Air then flows through the service pipe 13 or 14 to manifold 6 or 7 and is forced through outlets 8 under the hull and spreads throughout the area of recess B, it being understood that the valve 11 or 12 at the stern is kept closed. The pressure of the air supplied by the compressor will be sufficiently high to overcome the head or water pressure caused by the draught of the vessel so that a stratum of air may be obtained under the hull by displacement of water from the recess B. When a sufficient volume of air has been supplied to the recess, which may be observed by the escape of air bubbles at the sides of the vessel, or by gauge 15 in the service pipe, the air supply is shut down until the air pressure within recess B drops to a degree which would indicate the necessity for further supply by the compressor. This may be indicated by the pressure gauge 15 at either or both service pipes 13—14.

To insure even and rapid spread of the air supplied to recess B and to prevent complete escape of air from the recess due to list or rolling of the vessel, the bottom of the hull is provided with a series of auxiliary keels 16 extending longitudinally the whole length of the hull bottom as seen in Figure 2, and the ends of these auxiliary keels are joined to the manifold plates 5 forming a series of channels with which the manifold outlets 8 communicate at both ends in the type of vessel represented in Figure 1. These auxiliary keels may be of the same depth as the manifold plates 5 and keel plates 3—4, but as shown in Figures 3, 4 and 5 are of less depth to decrease the wetted surface. The spacing between the keels and the number of keels will be governed by the degree of list that is allowed for each type of vessel.

The depth of the keels and the spacing between them will bear a definite realtion in that the keels will be quite shallow and as thin as is consistent with necessary strength so that the recess B will be relatively shallow and the spacing between the keels as wide as possible depending upon the allowable degree of list of the vessel in the water, and so that the added area of the surface of the keels will be considerably less than the area of the hull between them and thereby avoiding increased wetted surface which would counteract the advantage gained by the stratum of air in the recess B.

In the application of the invention to vessels of different types it is preferable to provide the air inlet to the recess B at the forward end of the hull so that with the forward movement of the vessel the air will more readily spread rearward under the hull to form a continuous stratum in the recess. It is for this reason that in barges, scows, and all types of double-ended vessels, fore and aft air manifolds or outlets are provided as shown in Figure 1 so that the air supply may always be delivered at the forward end, or both ends if desired.

Referring now to Figures 7, 8 and 9, A represents the fuselage or hull of a seaplane, the bottom of which is provided with a shallow recess B as seen in Figures 7 and 9, and which recess is divided into longitudinal channels by keels 16 of a width equal to the depth of the recess. The forward end of the recessed bottom is curved inward toward the bow to follow the lines of the hull, and these curves are bevelled at 17 as seen in Figure 8. The rear end of the recess B is likewise bevelled as seen at 18, and stepped to conform to the upward sweep of the stern of the hull. The bevelled part 17 at the forward end of the recess is perforated with a series of holes 19, and on the interior of the hull a watertight casing 20 is provided extending from the forward point of the recess to a point beyond the furthest perforation on both sides. This casing with bevelled plate 17 constitutes an air manifold similar to the manifolds 6 and 7 in Figure 1, and to which air supply pipe 21 is connected as seen in Figure 7. This pipe leads to the pilot house where it is connected to a suitable valve 22 and pressure gauge 23, and from which air supply pipe 24 extends down to compressed air tank 25 to which the outlet of air compressor 9 is connected.

In operation, the application of the invention to a seaplane is similar to the operation above described in connection with the application of the invention to the type of vessel illustrated in Figure 1. The air from the compressor or other source is delivered through the pressure gauge 23 and valve 22 to the manifold 20 from which it escapes through outlets 19 into the channels of recess B formed by the keels 16, forward step 17 and rear steps 18.

In practice, as the seaplane beings to lift, the bow of the fuselage rises, lowering the water line on the hull from the bow toward the stern, but the recessed part of the hull will still be submerged, and hence the hull will practically move forward on a stratum of air. As the seaplane continues to rise and the forward end of the air recess is exposed, air will rapidly escape at that point, and the drop in pressure will be indicated on the gauge 23 in the pilot house. At such time the hull of the seaplane will be practically off the water and the operator guided by the indication of the drop in air pressure at the gauge will close the valve 22 and discontinue the operation of the compressor unless the compressed air is employed for some other purpose.

Where the invention is applied to large vessels such as steamships, the arrangement of the air recess and the mode of forcing air under the hull will be similar to the arrangement shown in Figure 8, that is, the recess at the forward and stern ends will follow the contour of the hull to a point fore and aft below the normal water-line and will be of substantially uniform depth throughout and divided into channels by auxiliary keels, and curved inward at the bow and stepped at the stern, so that the air supply will be trapped under the hull in the channels. Escape of air up the sides of the vessel due to list or rolling will depend upon the degree of list and exposure of the longitudinal channels, and in such case the air supply from tank 25 and compressor 9 will be opened at the control valve and the supply of air continued until the gauge shows the desired pressure.

From the foregoing description and drawings my method of reducing the skin friction on floating bodies by a stratum of trapped air will be readily understood by those skilled in the art to which the invention appertains, and while I have shown and described a construction and principle of operation for carrying the method into effect which I now consider to be the best embodiment of the invention, I desire it to be understood that the mode of application shown is merely illustrative, and that changes may be made to adapt the principle to various types of vessels or floating bodies without departing from the scope of the invention.

What I claim is:

The combination of a double-ended vessel having a hull, of means for reducing the skin friction on the hull comprising means including an air distributing manifold positioned on the hull bottom transversely of and at each end of said hull forming a chamber, longitudinally extending keel-plates on said hull between said manifolds, said manifolds having air discharge openings formed therein, an air supply duct connected to each of said manifolds, means for supplying air under pressure to said ducts and manifolds, and valves for controlling the flow of air to each of said manifolds to be discharged through the air discharge openings in said manifolds to be trapped in said chamber to provide an air stratum under said hull to move with and in the same direction as the movement of the hull of the vessel.

JOHN RINNE.